United States Patent [19]

Forkner

[11] 3,779,772

[45] Dec. 18, 1973

[54] METHOD OF MAKING EXPANDED FOOD PRODUCTS

[76] Inventor: John H. Forkner, 2116 Mayfair Dr. West, Fresno, Calif. 93703

[22] Filed: Apr. 28, 1972

[21] Appl. No.: 248,748

Related U.S. Application Data

[63] Continuation-in-part of Ser. No. 178,381, Sept. 7, 1971.

[52] U.S. Cl. ................................. 99/86, 99/38 R
[51] Int. Cl. .............................................. A23g 3/00
[58] Field of Search ............... 99/83, 86, 139, 138 R

[56] References Cited
UNITED STATES PATENTS

| | | | |
|---|---|---|---|
| 3,450,538 | 6/1969 | McKown et al. | 99/83 X |
| 3,366,485 | 1/1968 | Moen et al. | 99/83 |
| 3,366,484 | 1/1968 | Weiss et al. | 99/83 |
| 3,462,276 | 8/1969 | Benson | 99/83 |
| 3,441,418 | 4/1969 | Nishikiori | 99/86 |

*Primary Examiner*—Raymond N. Jones
*Attorney*—Paul D. Flehr et al.

[57] ABSTRACT

Method for the manufacture of expanded confection products in which the confection material before expansion is made into the form of an aggregate of granules that are fused or bonded together to form a slug or wafer. This slug or wafer is heated to a plastic state and subsequently cooled. After cooling, the product is placed in contact with a mass of cooked dough, heated to soften the same followed by expanding with the aid of a partial vacuum.

5 Claims, 12 Drawing Figures

METHOD OF MAKING EXPANDED FOOD PRODUCTS

CROSS-REFERENCE TO RELATED APPLICATIONS

Reference is made to copending applications Ser. No. 873,581 filed Nov. 3, 1969, now abandoned, Ser. No. 873,262 filed Nov. 3, 1969 now U.S. Pat. No. 3,711,300, and Ser. No. 178,381, filed Sept. 7, 1971, of which this application is a continuation-in-part.

BACKGROUND OF THE INVENTION

This invention relates generally to bakery and confection products of the type which have a confection material in expanded or cellular form bonded to a cooked dough. It also pertains to methods for the manufacture of such products.

In the past, various types of confections have been made which are in puffed or cellular form and which have a relatively high volume for their weight. For example, puffed or expanded confection balls have been made by subjecting a hot confection mix containing an expandable material (e.g., corn sugar) to a partial vacuum whereby the volume is greatly expanded and the moisture content reduced. Such puffed products are not adapted for bonding to cooked dough. The cellular structure is weak and lacking in uniformity, with some cells of excessive size. It is not feasible to promote bonding by moistening such products because of the frail structure. Furthermore, such mixes do not expand well or uniformly in contact with cooked dough.

In my copending application Ser. No. 873,581, of which this application is a continuation-in-part, there is disclosed a method for producing a product comprising cooked (e.g., baked) dough together with an expanded confection filler. Also in my copending application Ser. No. 873,262, of which this application is likewise a continuation-in-part, there is disclosed a method for the manufacture of products having an expanded confection filler which involves some molding or shaping of the expanded material whereby the resulting product has a predetermined configuration.

In the production of products comprising cooked dough together with an expanded confection filling, it is convenient to use a confection mix which is solid at ambient room temperature, as for example, a solid slug or wafer made by cooling and solidifying a fused fluid mix. When such a slug (e.g., one formulated like a malted milk ball confection) is deposited upon a layer of cooked dough (e.g., a cooky or cracker), it is difficult to heat the slug in such a manner as to obtain uniform expansion of the confection under vacuum with effective bonding of the confection to the dough. In a typical instance a cross-section of an expanded mass produced from such a slug will show cells varying widely in size from relatively large bubble-like cavities having weak walls to cells that are relatively small. Also bonding of the expanded confection to the dough tends to be relatively weak. When a cooky upon which such a slug is deposited is placed in a vacuum tray oven heat may be transferred to the slug largely by conduction through the cooky or through packaging material present. With that type of heat transfer heat may not be uniformly transmitted to the slug and some portions of the confection material may not be heated to a sufficiently high temperature to permit effective expansion under vacuum, whereby after expansion there may be masses which are relatively solid like hard candy. As indicated above, this tendency cannot be overcome merely by extending the heating period or by use of higher heating temperatures.

The present invention overcomes the difficulties referred to above. Particularly the present invention makes it possible to use lower temperatures immediately preceding expansion (e.g., confection temperatures of 100° – 160° F) and makes possible rapid and uniform heating to such temperatures, even though heating is largely by conduction through the adjacent dough or by transfer through the walls of a surrounding container. Also, according to the present invention there is uniform expansion and at the same time a good permanent bond is effected between the dough and the expanded confection.

There are many instances in which it is desirable for expanded food products as described above to include various edible additives such as pieces of nuts, bits of hard candy, chocolate and the like. It has been found unsatisfactory to incorporate such additives into the hot confection mix before solidifying by cooling. Some additives, such as malted milk, will disperse in the fluid confection mix and thus modify the ability of the mix to expand in a particular manner and lose their identity in the final product. Also when additives are introduced into the hot mix their flavoring properties are diluted in the final product.

SUMMARY OF THE INVENTION AND OBJECTS

It is an object of the present invention to provide an improved method for the manufacture of the above-described expanded products, and particularly a method which produces uniform and controlled expansion of the confection filling, even though some heat may be conducted from adjacent dough or through packaging material.

Another object of the invention is to provide a method of the above character which lends itself to the use of various edible additives in particulate form.

Another object of the invention is to provide a method of the above character which makes possible effective adhesion of the expanded confection filler with the cooked dough, including adhesion when the filler includes separate edible additives in addition to the primary granules.

Another object of the invention is to provide a method of the above character which makes possible the use of one or more additives which are such that they would dissolve or disintegrate in the hot viscous confection, but which in my method are maintained separate and distinct although forming a part of the over-all expanded mass in the final product.

A further object of the invention is to provide novel food products resulting from the above method. One particular product consists of a cooked dough (e.g., cooky) having a relatively uniformly expanded confection filling effectively bonded to the dough. Another product has an expanded filling which includes identifiable edible additives.

The present invention is characterized by use of a confection in the form of a slug or wafer which is made as an aggregate of primary expandable granules. The primary granules are bonded together after their surfaces have been made adhesive by heating. In the manufacture of the expanded products, such a slug or wafer is deposited on or adjacent to cooked dough and heated to plasticize the same, after which it is subjected to a partial vacuum to effect the desired expansion and dehydration. The expansion of the individual granules takes place together with over-all expansion of the mass. In addition to being expanded, the confection granules during expansion have sufficient stickiness to become attached or bonded to the surface of the cooked dough. In a preferred form of the invention the slug or wafer includes edible additives which retain their identity in the expanded mass.

Features of the invention include the following: The granules are formulated to provide the desired expandability, with moisture and sugar contents which maintains stickiness for effective bonding to dough. During expansion of the confection an effective bond is secured to the surface of adjacent cooked dough. This is secured at temperatures of the order of 100° to 160° F. at the time vacuum is applied. At such relatively low temperatures the dough is not injured. Also such temperatures can be attained by some heat transfer through the dough or through packaging material in which the product may be partially or completely enclosed. The individual granules of the aggregate are not diluted by the presence of less expandable ingredients and less expandable additives. Such additives when used are incorporated in the structure of the aggregate and are not primarily used as ingredients in formulating the granules. Thus the moisture content (or lack of moisture) of the additives does not affect the expandability or bonding properties of the granules. Also additives can be used which might be impaired or lose their identity if used in formulating the granules. When used according to the present invention, the additives retain their individual identity including flavor, order, coloration, density and dietetic value.

Additional objects and features of the invention will appear from the following description in which the preferred embodiments have been set forth in detail in conjunction with the accompanying drawing.

DESCRIPTION OF THE PREFERRED EMBODIMENTS

Figure 1:
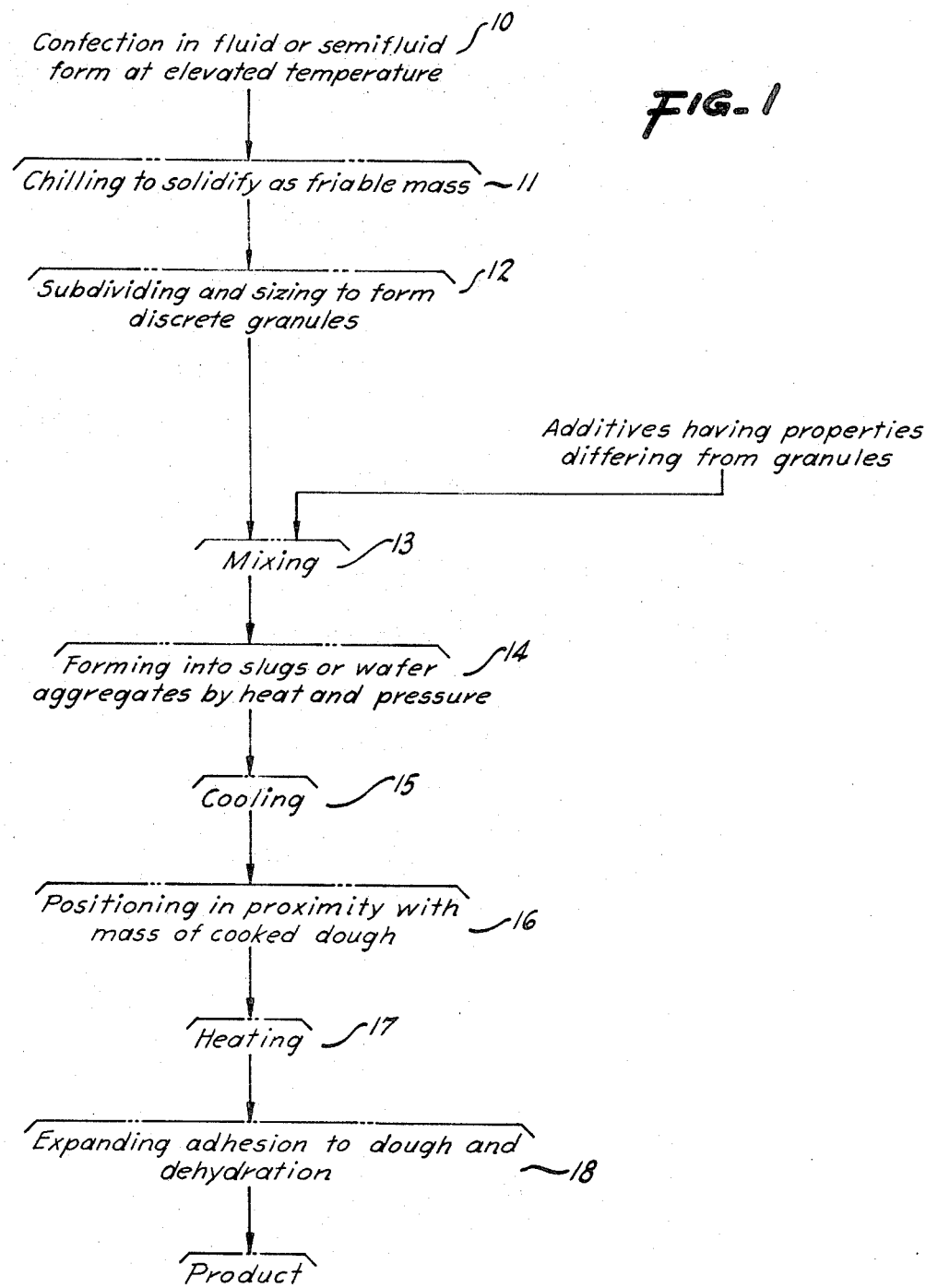
FIG. 1 is a flowsheet illustrating steps of the method.

The flowsheet of FIG. 1 illustrates steps for carrying out the present method in the manufacture of three different kinds of food products. The source material 10 consists of a confection material in fluid or semi-fluid form at an elevated temperature. As will be presently explained in greater detail, this is a formulation which has a substantial amount of sugar or sugar syrup which is capable of forming an expanded cellular mass when subjected to a partial vacuum while at an elevated temperature. Also this material is such that at ambient room temperature it is a friable solid. The formulated material is subjected to cooling or chilling in step 11 to produce a solid and friable mass. This chilling can be conveniently carried out by forming the material into sheets of a thickness of the order of from one-fourth to three-eighths inch and then cooling to a sufficiently low temperature to make the material brittle. By way of example, chilling may be to a temperature of the order of 80° F., or may be to a temperature well below ambient, such as a temperature of the order of 32° F. or lower. Chilling to lower temperatures speeds up processing in that it ensures a highly brittle material which can be readily subdivided to form granules of a desired size. In step 12, the brittle material from step 11 is broken up and subdivided to form a discrete granular material. The size of the granules may vary depending upon the type of products to be made, but in a typical instance they may be sufficiently small to pass through a No. 12 screen and remain upon a No. 24 screen. Subdividing can be carried out by the use of various types of hammer mills, or so-called breaker rolls. Sizing may employ simple screening to provide granules within the desired size range. Undersized material or "fines" may be recycled to steps preceding chilling.

Following formation of discrete granules in step 12, I prefer to intermix the granular material with one or more edible additives. In general, the additives serve to modify the eating properties of the finished product, or they may add one or more flavors, or they may supplement or modify dietetic properties. One suitable type of additive is nut meats (e.g., almond, walnut, peanuts, etc.) in particulate form. Another type is granules or small visible pieces of hard confection so formulated as not to be subject to expansion under vacuum. Pieces of sweetened or unsweetened chocolate are examples of another type of material. Certain additives, such as malted milk or other milk solids or supplemental sucrose sugar can best be added in dry powdered form. In some instances, it is desirable to add two or more of such additives, as for example, malted milk powder together with granulated sugar. In mixing step 13 the additives, whether powdered, particulate or both, are intermixed and dispersed in the mass of discrete granules. However, the primary granules remain essentially intact, and this is likewise true of the additives.

In step 14, the mixture from step 13 is made in the form of a slug or wafer of predetermined weight and dimensions, which has sufficient strength to be self-supporting and resists handling without breaking. This step is carried out by heating the mixture until the granules become plastic with sticky surfaces, after which the mixture is formed into an agglomerate mass. In carrying out step 14 it is generally convenient to cause a measured amount of the mixture from step 13 to be introduced into a mold, after which heat is supplied for a sufficient period of time to make the granules plastic. Then some pressure is applied to press the granules into more intimate contact and to compact the mass whereby when the mass cools it forms a solid body of predetermined weight and dimensions. One procedure using heat and pressure is to heat a layer of the granules to form a sheet of adhered granules, and then passing the sheet through die forming compression rolls, which provides formed slugs of the desired size and shape. In some instances heat may be applied simultaneously with pressure or heat alone may be applied to a mass of granules within a mold.

In carrying out step 14 the identity of the granules is retained, although the shaping of the individual granules may be somewhat modified. Likewise visible particles of additives may retain their identity and be identifiable in the compressed slug or wafer. It will be evident that the primary granules in the mix from step 13 must dominate the additives. Thus, the amount of granules present should be sufficient to enable bonding together to form an aggregaate which is solid and self-supporting. The additives are dispersed in the solidified mass, and depending upon their character, their surfaces may be attached by bonding to the granules. Cooling in step 15 may be carried out while the mix is under pressure and within the molding means or in instances where immediately after compression the aggregate material can be removed from the molding means, cooling may follow molding and compaction. Also, molding and cooling may follow heating of a layer of the granules to form a plastic sheet. In general, after cooling the material, it should have sufficient strength to enable it to be stored and handled without breakage.

To produce a product consisting of baked dough together with an expanded filler, one or more slugs or wafers (or pieces of such wafer) from step 15 are positioned in proximity with a mass of cooked dough, as for example on top of a baked cooky. This assembly is then heated in step 17 for a sufficient period of time and with application of sufficient heat to make the aggregate plastic. A partial vacuum is then applied to the assembly in step 18 whereby the material of the granules expands to produce the desired expanded filler. As the granules of the mass expand, the additives are oriented in the expanded mass, but tend to retain their general physical relationship with the mass.

It has been found that use of a slug or wafer aggregate as described above makes for relatively uniform expanded products. I attribute this to the fact that in the expanding operation the expansion occurs within the individual granules, thus avoiding relatively large pockets or regions where substantially no expansion occurs. Because of the relatively uniform expansion, the final expanded mass has good eating properties, and there is more uniformity between products produced from the same batches of material.

The time, temperature and pressure factors involved in step 14 may vary in accordance with the formulation of the initial confection. In general, the granules may be heated to a temperature of the order of 110° to 200° F. with application of oven temperatures of the order of 150° to 550° F. In place of conventional hot air oven heating, heat can be imparted by other methods, such as indirect or radiant or infra red heating. The time period of heating can be varied inversely with the oven temperature, and should be sufficient only to obtain the degree of softening or plasticity desired. Care should be taken to avoid use of such temperature and times as would liquify or fluidize the mass, or in other words, cause the granules to be homogeneously merged together. The pressure applied in step 14 is not critical but should suffice to produce a substantial reduction in volume (e.g., 25 percent). Assuming that no additives are used the compaction of the granular mass may reduce the volume by about one-third or so.

Figure 2:
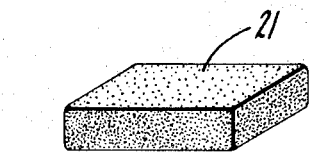
FIG. 2 is a perspective view of a wafer made in accordance with the present invention.

Referring to FIGS. 2 through 8 inclusive, FIG. 2 shows a wafer 21 made as described above. When the wafer is broken and viewed in section under a microscope, the aggregate nature of the wafer is clearly evident, and the individual granules can be seen to be bonded together and to surfaces of any additives present. Also the additives can be readily observed when in the form of larger particulates, such as nuts and the like. All of such additives are dispersed throughout the mass of the wafer and within its exterior surfaces, and are mechanically entrained in the aggregate structure formed by the primary granules.

Figure 3:
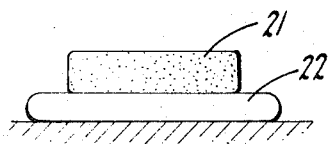
FIG. 3 is a side view of a cooky having the wafer of FIG. 2 placed upon the same.
Figure 4:
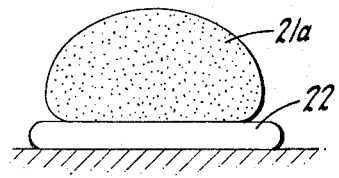
FIG. 4 is a view like FIG. 3 showing the expanded wafer forming a filling.
Figure 5:
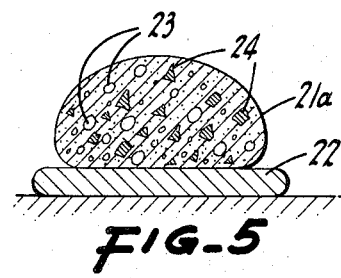
FIG. 5 is a view like FIG. 4 but in section.

FIG. 3 shows the wafer 21 deposited upon the surface of a baked cooky 22. FIG. 4 shows the assembly of FIG. 3 after it has been heated and expanded by application of vacuum. The resulting expanded filler 21a is bonded to the surface of the cooky 22, the bonding taking place during heating and expansion. As shown in FIG. 5, the cellular expanded mass 23 created by the expanded granules is indicated, and the solids 24 which are dispersed within the expanded mass represent added particulate material (e.g., nuts and the like). Any material added in finely divided form such as malted milk powder or granulated sugar is mechanically entrained and distributed throughout the expanded mass.

Figure 6:
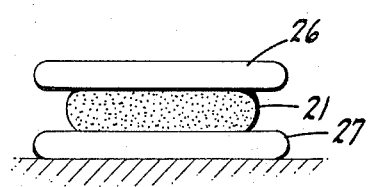
FIG. 6 is a view like FIG. 3 but with a second cooky on top of the wafer.
Figure 7:
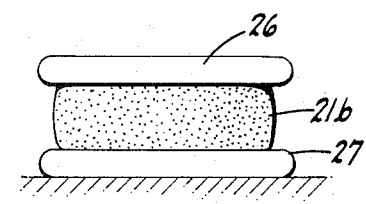
FIG. 7 is a view like FIG. 3 but showing the cooky after expansion of the filling.

FIG. 6 illustrates application of the wafer 21 between two baked cookies 26 and 27. Heating and expansion of this assembly produces a sandwich-like product shown in FIG. 7 where the cookies 26 and 27 have the expanded filler 21b between the same and bonded to their surfaces.

Previous reference has been made to the formulation of the source confection. This formulation should be such as to obtain rapid expansion with stickiness for effective bonding to dough. A number of sugars, sugar syrups, and sugar-containing materials possess the characteristic that when plastic at an elevated temperature and subjected to a partial vacuum they expand to form a cellular mass. This assumes that the material contains a certain amount of moisture (e.g., 6 percent) at the time of expansion. Assuming that the moisture content is reduced to a relatively low value (e.g., 1.5 – 2.0 percent) during expansion, then after cooling, the expanded cellular form is retained. Such sugars include commercial corn syrup (containing dextrose, maltose and dextrins), refined corn sugar (dextrose), malt syrup, malt sugar, molasses and hydrolyzed cereal solids (e.g., Morex made by Corn Products Refining Company with a dextrin equivalent of from 15 to 35). Also malted milk powder which contains casein and lactose possesses some of the same characteristics. Mixtures of these materials can be used, as for example, corn syrup and malted milk. In general such expandable formulations may be mixed in step 10 over a temperature range of from 180° to 250° F. The primary granules made of such expandable materials should be 50 percent or more by weight of the mass material making up the compacted slugs or wafers. The various confection formulas disclosed in my U.S. Pat. No. 2,988,318 can also be employed for making the granules. The size of the bulk of the expandable granules may range from about 20 to 10 mesh.

A wide variety of natural and artificial flavors and flavor imparting ingredients can be added to the primary confection used in making the granules or such flavoring materials can be added in particulate or powdered form as additives inn the mixing step 13.

In addition to supplying additives in particulate or powdered form in step 13, additives may be supplied as coatings to the granular material after subdividing in step 12. Thus additives such as chocolate or waxlike materials like Myvoset can be applied in liquid form and congealed upon the surfaces of the granules.

Certain additives supplied in step 13 may modify the subsequent expansion when vacuum is applied. Thus, added solid particles like nut meats or sucrose will not expand, thus tending to reduce the over-all expansion of the mass. Also when a material like malted milk is added as a powder, the rate of expansion of the additive is not the same as the rate of expansion of the granular material from step 12, thus again modifying the over-all expansion and also the texture of the finished expanded material. Differences in the amount of expansion experienced under vacuum may be due in part to differences in moisture content.

Figure 8:
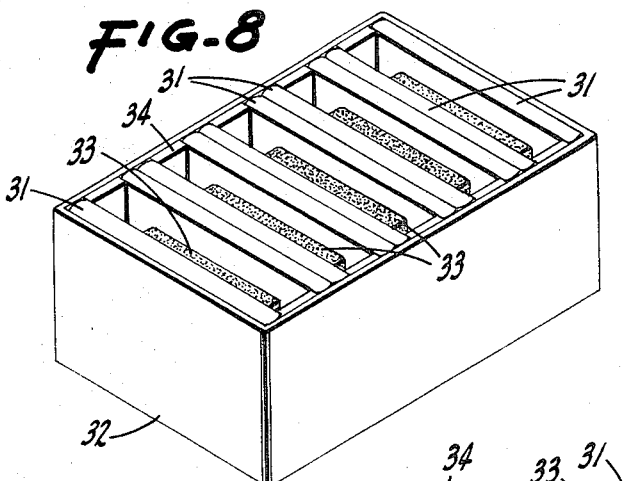
FIG. 8 is a perspective view illustrating an assembly of cookies and expandable wafers in a tray.
Figure 9:
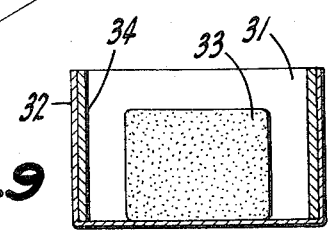
FIG. 9 is a cross-section of the assembly shown in FIG. 8.
Figure 10:
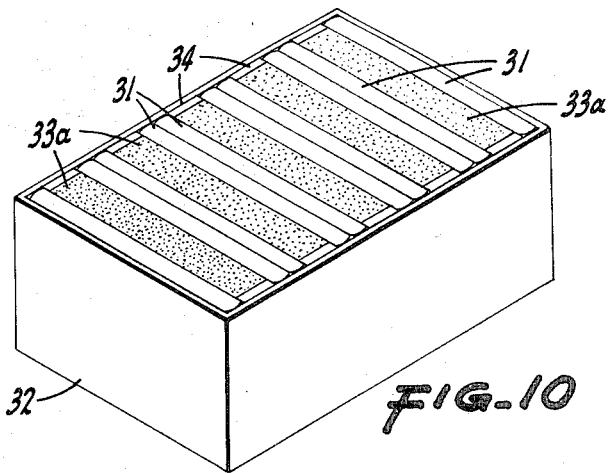
FIG. 10 is a perspective view like FIG. 8 after expansion of the wafers.

As illustrated in FIGS. 8 through 10, some molding may occur during expansion for the purpose of producing final products of particulate configuration. As shown in FIG. 8, cookies 31 which are rectangular are positioned between the side walls of a tray 32. It will be noted that one cooky is adjacent each end wall of the tray and other cookies are arranged in pairs, with each pair being spaced apart from the other pairs. The ends of the cookies may be frictionally engaged with the side walls of the tray to prevent movement in a direction corresponding to the length of the tray, or the side walls of the tray may be provided with suitable retaining means for this purpose. Wafers 33 as previously described are shown disposed between the cookies, after which the tray and contents are placed in an oven for heating the wafers 33 to cause the granules to become plastic, and a partial vacuum is applied to effect expansion. The initial wafers are of such size, and the heating and expansion are controlled in such a manner that the expanded material entirely fills the spaces between the cookies. During expansion a restraining surface can be applied across the top of the tray, providing in this instances a smooth flat surface against which the filling expands. A package formed in this manner is shown in FIG. 9. The expanded filling 33a is bonded to the adjacent two cookies and completely fills all space between the cookies. Also the upper surface of the expanded material is contiguous with the upper plane of the tray and the upper exposed surfaces of the cookies.

Figure 11:
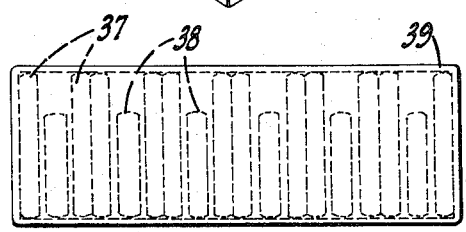
FIG. 11 is a side elevation showing the assembly of FIG. 8 with an outer wrapping.

Instead of using a special molding tray, it is desirable to use a tray which later becomes a part of the marketing package. Also a suitable unsealed wrapper (e.g., wax paper or polyethylene film) can be applied about the tray before heating and expansion. The tray 32 shown in FIG. 11 is assumed to be one suitable for marketing, and it is shown provided with the cookies 37 and expandable wafers 38 substantially the same as in FIG. 7. It is also enclosed within a polyethylene or like wrapper 39 which is closed at the left-hand end as by heat sealing but is unsealed at the right-hand end. After this assembly has been subjected to heating and a partial vacuum to effect expansion to form the expanded fillers, the right-hand end of the wrapper is sealed by conventional means and the package is then in condition for marketing. When using a wrapper as in FIG. 10, it will be evident that the wrapper itself can serve as a restraining surface to prevent expansion of the filler beyond the desired confines.

With respect to preventing displacement of the cookies during expansion of the filler, FIG. 9 illustrates suitable means for this purpose consisting of inserts 34 along the side walls of the tray which form spacers between the ends of the cookies to prevent their displacement.

Figure 12:
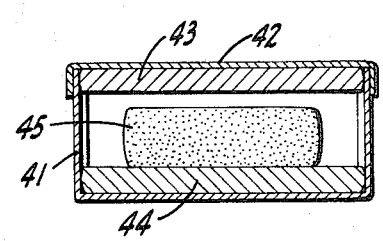
FIG. 12 is a side elevation in section showing another simple assembly of cookies and wafers in a molding package.

In place of using a tray in the manner illustrated in FIGS. 8 through 11, any suitable molding arrangement can be employed provided it has the necessary restraining walls and is arranged to accommodate the cookies and the pellet or wafer of expandable material. In FIG. 12 the molding means is a box 41 with a closure 42. The box is sized to receive the two cookies 43 and 44 and the intervening wafer 45. Also it may have an outer unsealed wrapper (not shown). The assembly can be heated and subjected to a partial vacuum to produce an individual edible packaged product, the product when removed from the box consisting of two cookies bonded to opposite sides of the expanded confection filling.

Examples of my invention are as follows:

EXAMPLE 1

A confection material dominated by the presence of corn sugar and having pronounced vacuum expandable properties was prepared using the following formula:

|  | pounds |
|---|---|
| corn syrup (e.g., glucose 80 Brix | 100 |
| dry corn sugar | 100 |
| malt syrup (diamalt) | 30 |
| granulated sugar | 50 |
| hard fat (melted point 130°F.) | 20 |
| malted milk powder | 30 |
| salt | 1 |

Additional additive materials were used as follows:

|  | pounds |
|---|---|
| powdered malted milk having a size such that the bulk of the material passed through a 40 mesh screen | 80 |
| granulated sugar having a size such that all of the material would pass through a 60 mesh screen | 80 |

The dry ingredients of the first formula, namely the dry corn sugar, granulated sugar, malted milk powder and salt, were blended together and then added in a steam jacketed Sigma type mixer to the corn syrup, while the latter was at boiling temperature. Thereafter the fat was added. The moisture content of this mix was about 6 percent, representing largely that imparted by the corn syrup. During mixing, additional heat was supplied by way of the steam jacket of the mixer to retain plasticity of the mass and to obtain a terminal temperature of about 200° F. The hot plastic mass was removed from the mixer and passed through rolls which served to form sheets about three-sixteenths inch thick. As the sheets cooled to about 80° F., they became brittle. Cooling was accelerated by blowing cold air at about 20° F. over the sheets. The sheets at about 70° F. were randomly broken and passed through paired breaking rolls to subdivide thhe material into granules. Sizing was carried out by sifting through a No. 12 screen and by removing fines passing through a No. 24 screen. Fines and oversize material were recycled in the process. The moisture content of the granules was about 5.5 to 6 percent. A 100 lb. batch of the granules was introduced into a mixing blender, together with measured amounts of the additive materials, namely, 25 lbs. of the powdered malted milk and 25 lbs. of the granulated sugar. As indicated above, the powdered additives were of substantially smaller particle size than the size of the granules. Blending was continued to effect uniform distribution of the additives in the mass of granules. This blend was then introduced into a plurality of floured baking trays, with the contents of each tray being levelled off to provide a layer about one-half inch thick. A sheet of aluminum was then deposited on top of each layer, the dimension of the aluminum sheet being such as to substantially completely cover the layer. Each sheet was made of aluminum about one-fourth inch thick and had sufficient weight to effect some initial compaction of material in the next operation. The trays were then placed in an oven and subjected to an oven heat of 400° F. for about 6 to 8 minutes. During this time top heat was transmitted through the aluminum sheet, and through the tray to elevate the temperature of the layer of material to about 140° F. It was observed that at that temperature the granules were softened and sufficient plasticity developed to permit compaction and bonding of the granules together. The smaller sized and dryer powder particles of the additives remained substantially intact and in the same position within the mass that they occupied at the time the material was introduced into the trays. Upon removal from the oven further compaction was effected by passing the trays through rolls whereby each layer was compressed to about three-eighths inch thick. This was a reduction in volume of about 25 percent. The overlying aluminum sheets were then removed and the compacted layers were scored along parallel score lines extending at right angles to each other and about 1 inch apart. The sheets were then permitted to cool to ambient room temperature, after which they were broken along the score lines to form wafers each measuring about 1 inch square and about three-eighths inch thick.

The unexpanded wafers made as above were used to make cookies having an expanded filler. Thus, the wafers were broken into smaller pieces weighing about 15 grams each, and these fragments were then placed on top of prebaked cookies. The cookies were then placed in an oven and heated for about 4 minutes with an oven temperature of 300° F., which served to soften the wafer material to plastic state. The cookies were then placed in a vacuum oven on shelves or trays heated to 200° F., and a vacuum corresponding to 29.5 inches mercury column was applied. The confection wafer was thereby expanded to about four times its previous volume. Application of vacuum was continued until the moisture content of the expanded filler was less than 2 percent, and then the product was removed from the oven. This required a total treatment time of about 40 minutes in the vacuum oven. It was found that the filler remained expanded and it was bonded to the adjacent surface of the cooky. According to my observations, the effective bond was at least in part due to the fact that the softening and expansion occurred before dehydration of the confection material in the vacuum oven. Thus, although the area in contact between the confection material and the cooky increased during this time, sufficient moisture was present to obtain adhesion over the entire area of final contact. Here again it was noted that the texture of the expanded filler was relatively uniform and had the characteristics previously described. I attributed the good bond to the aggregate form of the unexpanded particles which preserved the expandable sugars in discrete form so that when expansion occurred, and before dehydration was particularly effective, the expanding confection presented ahdesive surfaces into contact with an increasing area of cooky surfaces. With subsequent dehydration the sticky adhesive surfaces were set and the bond made permanent.

EXAMPLE 2

The procedure was similar to that described in Example 1. However, the formula for additives was modified by reducing the amount of granulated sugar by one-half and by substituting a mixture of equal parts chopped nuts and hard colored candy bits. These particles were of such size that they passed through a No. 4 screen but remained on a No. 12 screen. Upon examination of the resulting wafers, it was found that the added nuts and candy bits retained their identity in the mass and were placed on cookies, and thereafter the same procedure was followed as in Example 2. Each wafer expanded to the form of a mass having a volume about three times the volume of the original wafer. Here again the expanded mass was effectively bonded to the surface of the cooky, and it was observed that the chopped nuts and colored candy bits were intact in the expanded mass and effectively distributed throughout the same. In similar tests I confirmed that the character of the candy bits could be modified without materially modifying expansion of the granules. Particularly by changes in formulation the additives themselves could be expanded to varying degrees.

EXAMPLE 3

The procedure was similar to that described in Examples 1 and 2. However, the formula for additives was modified by reducing the amount of granulated sugar by one-half and by substituting a mixture of equal parts chopped nuts and hard colored candy bits. These particles were of such size that they passed through a No. 4 screen but remained on a No. 12 screen. Upon examination of the resulting wafers, it was found that the added nuts and candy bits retained their identity in the mass and were placed on cookies, and thereafter the same procedure was followed as in Example 2. Each wafer expanded to the form of a mass having a volume about three times the volume of the original wafer. Here again the expanded mass was effectively bonded to the surface of the cooky, and it was observed that the chopped nuts and colored candy bits were intact in the expanded mass and effectively distributed throughout the same. In similar tests I confirmed that the character of the candy bits could be modified without materially modifying expansion of the granules. Particularly by changes in formulation the additives themselves could be expanded to varying degrees. from the chamber and passed through a sealing machine which served to complete the wrapper seal. This served to form a vapor barrier for the package. Upon removing the contents of the tray, it was found that each expanded mass had completely filled the space which the confection wafer had occupied, and each expanded mass was effectively bonded to the surface of the adjacent cookies. The items of the package were in effect sandwich-like products, each comprising two rectangular cookies with the expanded filler between the same. Here again it was noted that the filler had a relatively uniform cell structure throughout.

In the above Example 3 the malted milk and granulated sugar were additives. The malted milk had expandable properties differing from the granules, while the granulated sugar was not expandable.

I claim:

1. A method for the manufacture of food products having a confection filling in expanded cellular form, comprising forming discrete granules of a sugar based confection material, heating the granules to cause them to become plastic with sticky surfaces, forming aggregate slugs or wafers from the heated granules by agglomerating the same, cooling the slugs or wafers, placing such an aggregate slug in proximity with a mass of cooked dough, and applying heat to the assembly whereby the confection granules are softened and subjecting the assembly to a partial vacuum to effect expansion of the same to form a product comprising a mass of baked dough together with an expanded confection filling bonded thereto.

2. A method for the manufacture of food products having a sugar based confection filling in expanded form, comprising the steps of forming a sugar based fluid confection of expandable material at an elevated temperature, cooling the material to solidify the same as a friable mass, subdividing the friable mass to form discrete granules, heating a measured quantity of the granules to cause the granules to become plastic with sticky surfaces, forming the plastic granules into aggregate slugs or wafers, cooling the slugs or wafers to solidify the same, subsequently positioning a slug in proximity with a mass of baked dough, heating the assembly to cause the granules of the slug to become plastic and sticky and subjecting the assembly to a partial vacuum to effect expansion of the granules, thereby forming an expanded filling bonded to the dough.

3. A method as in claim 2 in which the said measured quantity of granular material is intermixed with an edible particulate additive before heating and forming the same into a slug or wafer.

4. A method as in claim 3 in which at least a part of the additive material is in the form of a powder.

5. A method as in claim 3 in which the granules of the wafers have a moisture content of the order of 6 percent and sufficient to promote stickiness when the wafers are heated to soften the granules and in which the particulate additive has a moisture content less than that of the granules.

* * * * *